Figure 5:
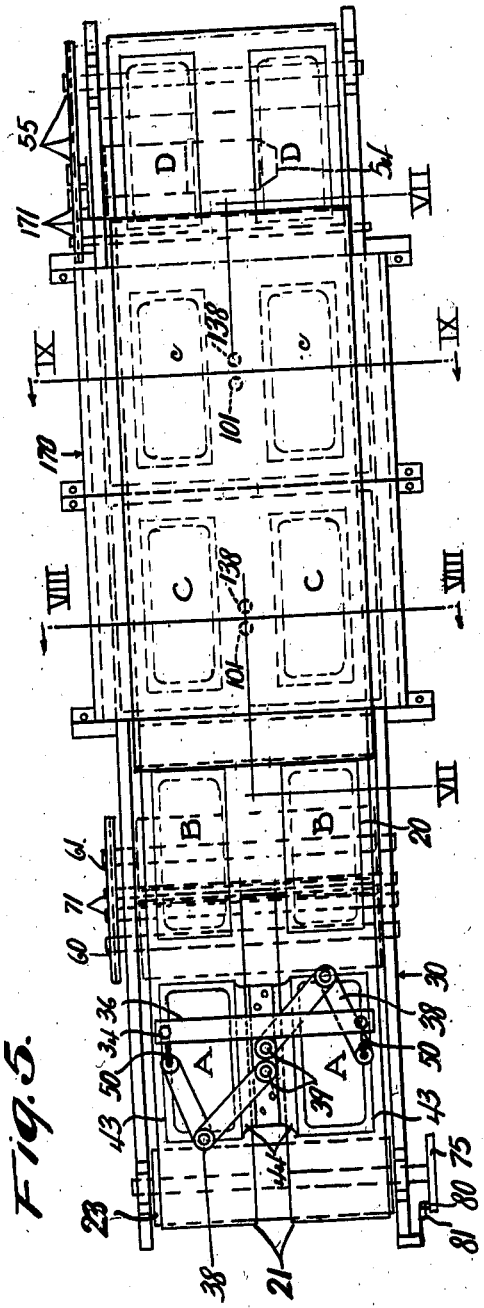

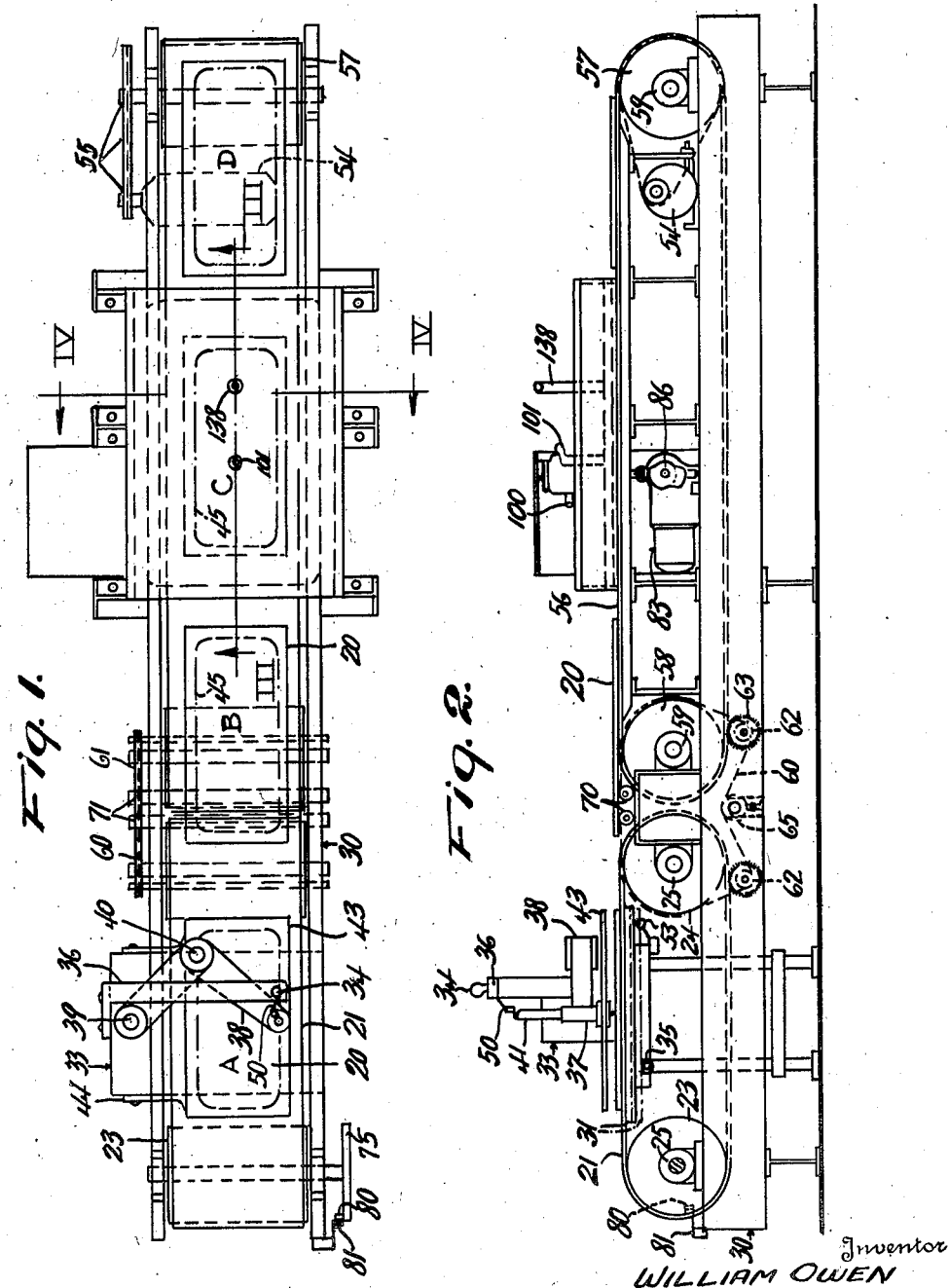

April 13, 1943.  W. OWEN  2,316,532
APPARATUS FOR REMOVING MARGINAL PORTIONS OF GLASS UNITS
Filed June 20, 1940  5 Sheets-Sheet 2
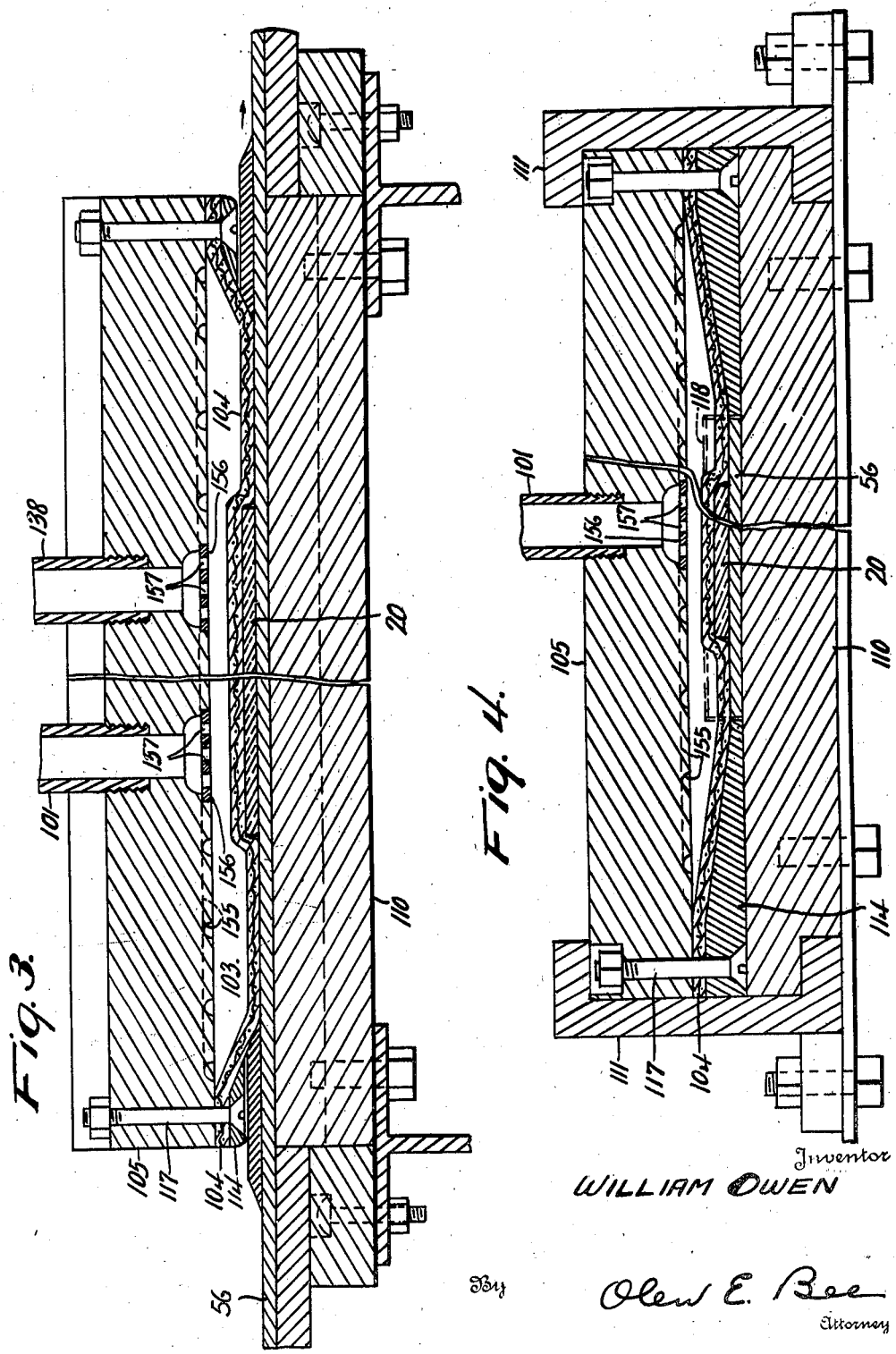
Inventor
WILLIAM OWEN
By Olew E. Bee
Attorney April 13, 1943.  W. OWEN  2,316,532
APPARATUS FOR REMOVING MARGINAL PORTIONS OF GLASS UNITS
Filed June 20, 1940  5 Sheets-Sheet 3

Inventor
WILLIAM OWEN
By Olew E. Bee
Attorney

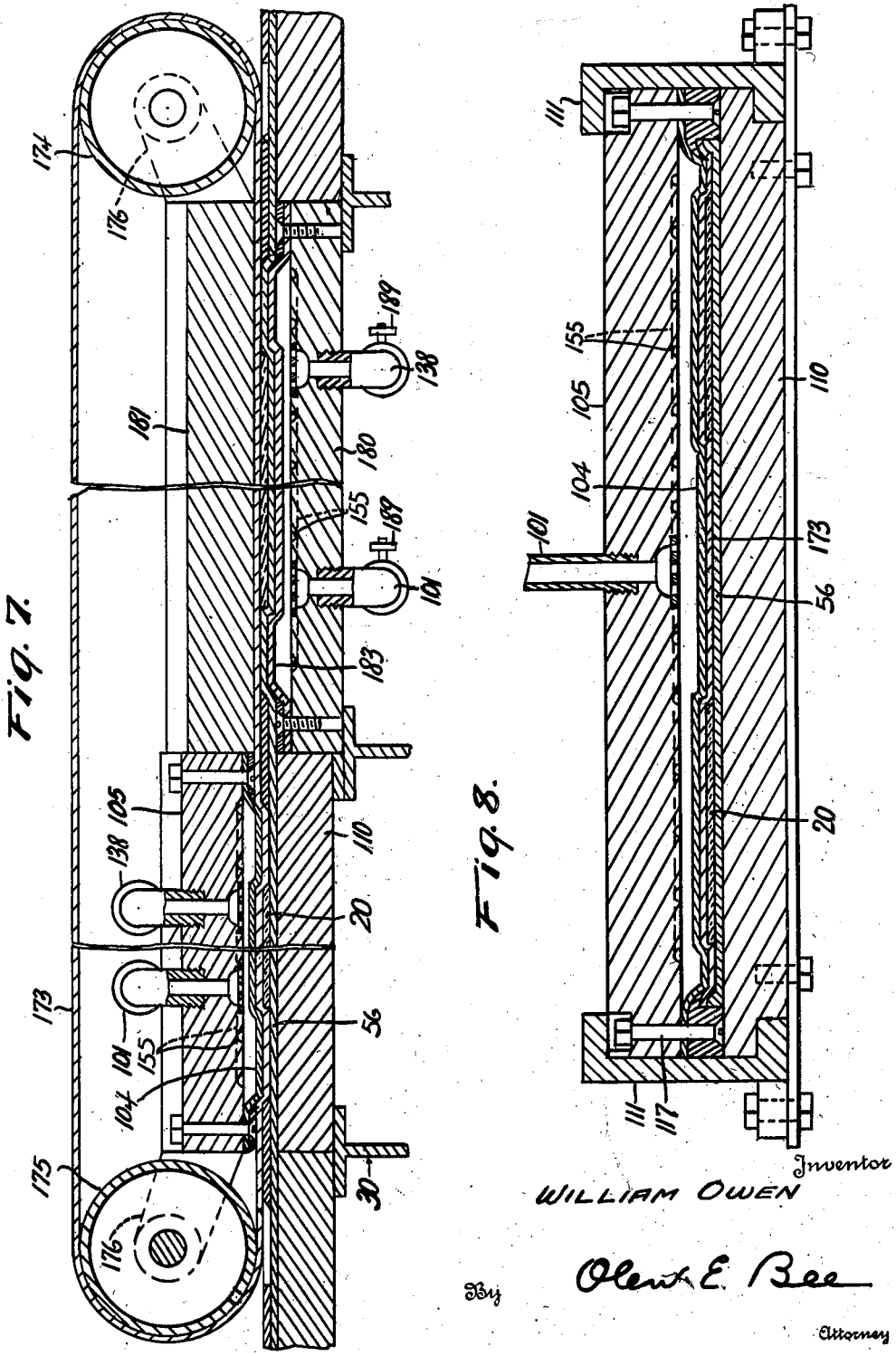

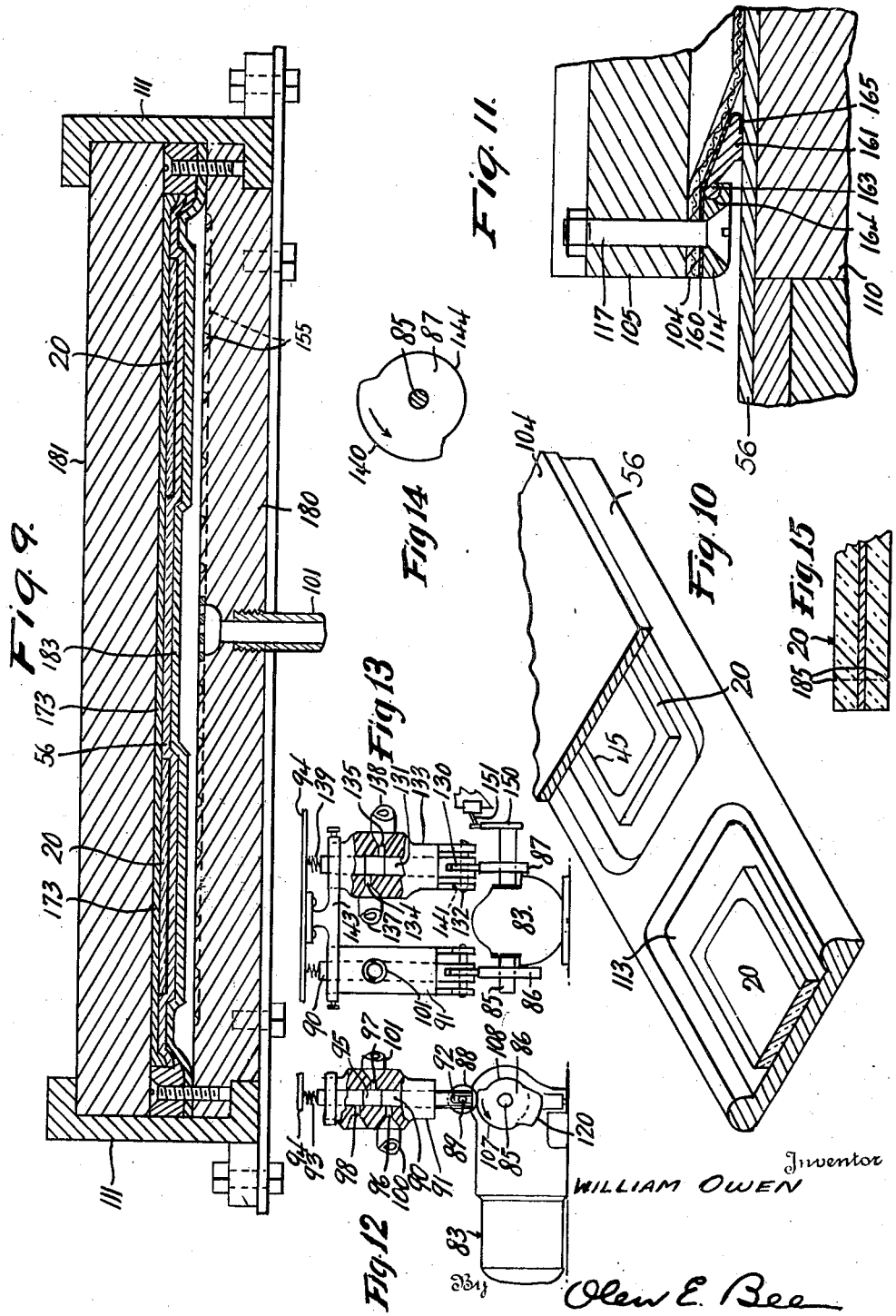

Patented Apr. 13, 1943

2,316,532

UNITED STATES PATENT OFFICE 2,316,532

APPARATUS FOR REMOVING MARGINAL PORTIONS OF GLASS UNITS

William Owen, Pittsburgh, Pa., assignor to Pittsburgh Plate Glass Company, Allegheny County, Pa., a corporation of Pennsylvania Application June 20, 1940, Serial No. 341,476

11 Claims. (Cl. 49—48)

This invention relates to apparatus for removing marginal portions of sheet glass and it has particular relation to improved structure for handling the glass under influence of fluid pressure incidental to the final stages of glass removing operations.

The type of apparatus involved is related to that disclosed in the joint application of W. H. Craig and G. I. Finley, Jr., Serial No. 326,206, filed March 27, 1940, which issued as Patent No. 2,291,451, July 28, 1942.

One object of the invention is to provide an improved apparatus for running cuts or scores by the use of fluid pressure.

Another object of the invention is to provide an improved apparatus for operating a flexible member under the influence of fluid pressure against the surface of a glass unit to remove marginal portions of the latter.

Another object of the invention is to provide improved fluid pressure apparatus for operating upon scored sheet glass units.

In trimming marginal portions of sheet glass for various purposes, considerable difficulty has been experienced in providing a uniform breaking or snapping of the glass which will produce a new edge free from chipped or rough corners, and which provides square edges; that is, edges which are in truly perpendicular relation to opposite faces of the glass. According to previously proposed methods, considerable marginal waste or so-called shrinkage was involved because it has been found that locating the cut or score near the glass edge resulted in excessive breakage and uneven finished product. The removal of the marginal glass portions after the cutting operation is known as "running cuts."

In running cuts according to this invention, uniform fluid pressure is applied to the cut or scored sheet in such manner as to remove the marginal portions and leave square edges free from flares and chipping. A flexible or resilient diaphragm is pressed upon the face of a scored glass sheet, the latter of which rests upon a suitable cushioned support and then pressure is applied to the diaphragm to press the glass against the support. The pressure can be applied in opposite directions at different locations in the press. A conveyor system which carries the glass units from a cutting machine to the press is synchronized with the other mechanism for automatically accomplishing the successive operations of progressively moving glass to and from the press and applying pressure at the time it reaches the proper position in the press. In running cuts on opposite sides of laminated glass, the latter is transported to a press structure which applies pressure upon one side of the glass and then it is immediately subjected to similar pressure upon its opposite side.

Figure 6:
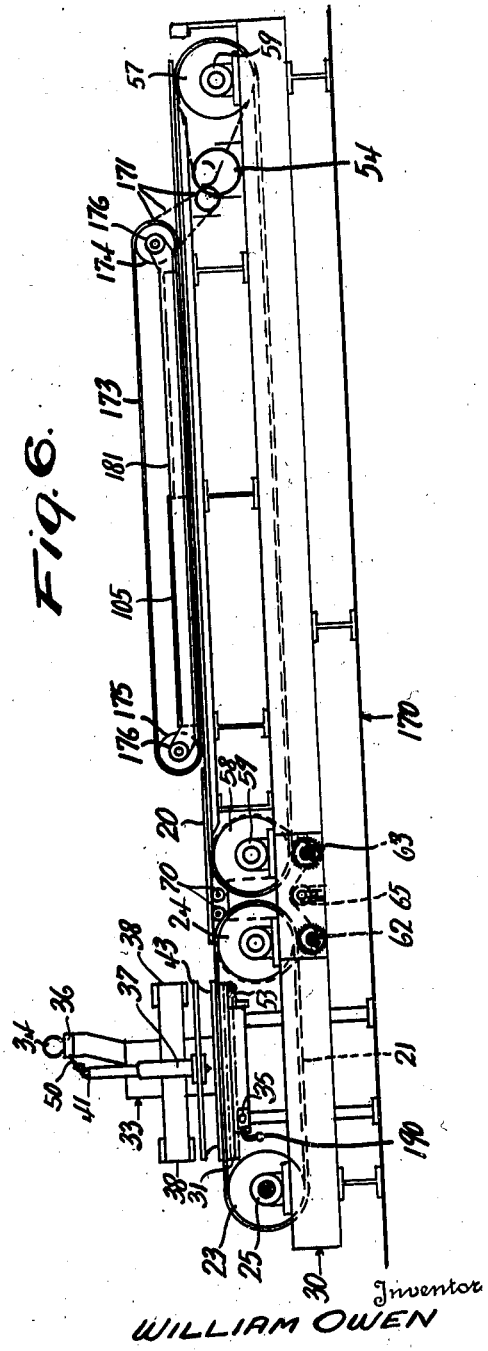

In the drawings:

Fig. 1 is a diagrammatic plan of an apparatus for running cuts in sheet glass; Fig. 2 is a diagrammatic side elevation of the structure shown in Fig. 1; Fig. 3 is a fragmentary vertical section, on a larger scale, taken substantially along the line III—III of Fig. 1; Fig. 4 is a fragmentary vertical section on a larger scale taken substantially along the line IV—IV of Fig. 1; Fig. 5 is a diagrammatic plan of another form of apparatus for running cuts in the sheet glass; Fig. 6 is a diagrammatic side elevation of the structure shown in Fig. 5; Fig. 7 is a fragmentary longitudinal section, on a larger scale, taken substantially along the line VII—VII of Fig. 5; Fig. 8 is a vertical section, on a larger scale, taken substantially along the line VIII—VIII of Fig. 5; Fig. 9 is a vertical section taken substantially along the line IX—IX of Fig. 5; Fig. 10 is a fragmentary perspective of a conveyor belt for sheet glass; Fig. 11 is a fragmentary cross section, on a larger scale, of an arrangement of another form of stationary press head and diaphragm; Fig. 12 is a side elevation of a motor unit and fluid control valve structure shown partially in cross section; Fig. 13 is an end elevation of the structure shown in Fig. 12 and including portions shown in cross section; Fig. 14 is a side elevation of a valve operating cam; and Fig. 15 is a fragmentary cross section of a laminated glass unit.

Referring to Figs. 1 to 4, a sheet glass unit 20 is positioned horizontally upon a conveyor 21 which is in the form of a felt-covered belt, or a belt made of such material as to be yieldable to a limited degree under pressure, and is trained about spaced drums 23 and 24 that have bearing supports 25 in an apparatus frame 30. The upper reach of the belt 21 normally rests upon the upper surface of a raising and lowering platform 31 of a glass cutting or scoring machine 33 of the type disclosed in United States Patent No. 2,048,935, dated July 28, 1936. When the machine 33 is inactive, the platform 31 is in its lower position indicated in broken lines of Fig. 2, and in this relation one of the sheet glass units 20 can be positioned on the portion of the belt disposed thereon.

The apparatus frame carries an electric bulb 34 upon a frame extension 36 and this bulb is energized at the time the operation of the apparatus is commenced. In initiating such operation of the cutting machine, a starting switch or button 35 is actuated to energize the machine in such manner as to raise the platform 31, as well as to lift the upper reach of the belt and the glass carried thereby. This action raises the glass to such position that its upper surface is engaged by a cutting tool 37. The bulb 34 is also lit by the actuation of the button 35 to provide a signal indicating that all of the mechanism is ready for operation. A horizontally movable sectional arm 38 at its outer end supports the cutting tool 37, and the arm has a pivotal connection 39 upon the frame structure. The arm also has an intermediate pivotal connection 40 which provides for proper flexibility among the sectional portions of the arm.

An operator grasps a handle 41 of the arm and moves the cutting tool 37 in a path determined by a template 43 with which a sheet glass unit has been aligned and which is secured to the apparatus in a position above the conveyer belt by means of supporting members 44. A substantially endless score or cut 45 is thus made in the upper surface of the glass adjacent its edges.

At the completion of a substantially endless cutting or scoring operation, the handle 41 of the cutting tool strikes a limit switch 50 carried by the extended frame portion 36 of the apparatus frame and in response to this action the platform 31 is released and drops to the position indicated in broken lines of Fig. 2. As the platform reaches its lower position, it actuates a second limit switch 53 positioned on the machine frame to complete an electric circuit with an electric motor 54 for energizing the latter. The motor is supported upon the frame structure in the manner shown in Fig. 2. Suitable sprocket and chain gearing 55 is connected to the motor for driving a second conveyor 56 similar to the conveyor 21 and the conveyor 56 is carried by drums 57 and 58 that are rotatable in bearing supports 59 provided in the frame. Driving power from the motor is transmitted through the drum 58 to the drum 24 by means of a sprocket chain 60 which is connected in driving relation with sprockets 61 carried by these drums. This chain is further trained about sprockets 62 carried by brush rolls 63 that are rotatably mounted in the frame 30. A suitable adjustable idler 65 is also rotatably carried by the frame and is engaged by the chain 60 for maintaining proper tension therein.

A pair of smaller rolls 70 having their upper surfaces substantially horizontally aligned with the upper surfaces of the drums 24 and 58 are rotatably supported in the frame and are provided with sprockets 71 engaged by the chain 60 for driving them. The peripheral speed of these rolls, which form parts of the conveyor system, is substantially the same as the peripheral speed of the drums or the linear speed of the belts, and they aid in transferring the glass unit from the belt 21 to the belt 56. However, the peripheral speed of the brush rolls 63 is relatively greater for the purpose of frictionally brushing the surfaces of the belts along their lower reaches and removing whatever foreign matter that might be collected thereon.

In response to operation of the motor 54 and the consequent travel of the conveyor belts, the sheet glass unit 20 is moved forwardly from the station indicated at A to the station indicated at B. The distance from A to B corresponds to the circumference of the drum 23, and at the completion of one revolution of this drum, which includes an offset section 75, a tripping member 80 carried by this section actuates a multiple switch 81 that breaks an electric connection with the motor 54 to arrest the operation of the latter. This action provides for stopping the belts and maintaining them in stationary position for a predetermined interval.

The action of the switch 81 in addition to arresting the operation of the motor completes an electric circuit to a timing motor unit 83 which includes reduction gearing and brake of conventional construction. This unit has a driven cam shaft 85 (Figs. 12 and 13) provided with cams 86 and 87 rigidly secured adjacent opposite ends thereof. The cam 86 rotatable in the direction indicated by the arrow in Fig. 12 engages a roller 88 rotatable upon a pin 89 that is carried in the lower end of a pressure valve 90, and a casing 91 slidably receives this valve. The pressure valve is so called because it is designed to control fluid under pressure.

Diametrically opposite guides 92 formed in the lower portions of the casing structure provide for proper vertical movement of the pin 89 carrying the roller and prevents tilting of the valve body. The valve has a compression spring 93 secured between its upper end and an element 94 of the apparatus frame and the action of this spring maintains the roller 88 pressed firmly against the face of the cam 86.

An intermediate portion of the valve 90 includes a valve slot 95 extending therethrough and which is registerable with openings 96, 97 and 98 formed in the valve casing 91. The openings 96 and 97 communicate in fluid tight relation with flexible conduits 100 and 101, respectively, and the opening 98 provides an exhaust port. The conduit 100 communicates with a suitable source of fluid under pressure (not shown), and the conduit 101 communicates with a space or fluid tight chamber 103 formed by a diaphragm 104 secured along its marginal portions to the face of a stationary press jaw 105. Normally the roller 88 rests upon a neutral section 107 of the cam 86 and upon rotation thereof in the direction of the arrow shown in Fig. 12, the roller under the influence of the compression spring 93 shifts to an adjacent cam section 108 thereby moving the valve and placing the slot 95 in communication with the conduits 100 and 101 to provide for the supply of fluid under pressure therethrough to the diaphragm.

A scored glass unit 20 which has been transported by the conveyor belt to a position immediately opposite the diaphragm is pressed, together with the belt, against an opposed bed plate or press jaw 110 over which the conveyor belt travels. The jaws 105 and 110 are rigidly secured in spaced relation as a stationary structural unit by means of clamps 111 of C-shape in cross section. These clamps are secured along the sides of the apparatus frame of which they form a part. The jaws are spaced only sufficiently to provide for a free passage therebetween of the conveyor belts with the glass units carried thereon. In order to provide minimum space through which the diaphragm may bulge, the conveyor belt is formed with spaced dished or pocketed portions 113 (Fig. 10) in which the glass units are disposed. The longitudinal sides of the upper jaw upon which the diaphragm is secured is provided with filler strips 114 which substantially fill the space between the jaws 105 and 110 along their marginal side portions. Additional fillers 114 are secured at opposite end portions of these jaws and are thinner in order to provide space in which the belt and glass can travel without interference. Suitable fasteners 117 secure the fillers and diaphragm in fluid tight relation against the lower side of the upper jaw 105. Relatively narrow belt-receiving openings or slots 118 are thus formed at opposite end portions of the jaws.

The conveyor belt 56 is composed of such material, for example, rubber compound or rubberized fabric, as to provide a cushion or slightly yieldable support for the glass and upon subjecting the glass unit upon the belt to fluid pressure, the marginal portions are snapped along the scored lines thereof in the manner described in the copending application, Serial No. 326,206 above mentioned.

So long as the roller 88 is in contact with the cam section 108, the fluid under pressure is supplied to press the diaphragm against the glass unit. However, the speed of rotation of the cam is such that this period is only a few seconds. Continued rotation of the cam 86 engages the roller 88 with a higher so-called exhaust section 129 of the cam and in response to this action, the valve is moved to such position that the valve slot 95 communicates with the exhaust opening 98 through which pressure in the chamber 103 is automatically relieved. Then upon continued rotation of the cam, the neutral cam section 108 again is engaged by the roller 88 to bring the slot 95 to its neutral or full line position shown in Fig. 12 wherein the valve is closed to prevent communication of the conduit 101 with either the pressure conduit or exhaust port.

During these operations the cam 87 is also in engagement with a second roller 130 mounted upon the lower end of a vacuum valve 131, so called because it controls the application of sub-atmospheric pressure. A suitable bearing pin 132 rotatably carries the roller upon the valve body. The vacuum valve is slidably mounted in a casing 133 which has ports 134 and 135 communicating through flexible conduits 137 and 138 in fluid tight relation with a source of sub-atmospheric pressure (not shown) and the chamber 103, respectively. A compression spring 139 is interposed between the upper end of the valve 131 and the frame element 94 to maintain the valve roller 30 constantly pressed against the cam 87. In its normal position the roller engages a vacuum section 140 of the cam. Diametrically opposite guides 141 formed in the lower portions of the casing structure 133 provide for proper vertical movement of the pin 132 and prevents tilting of the valve body. Both valve casings 91 and 133 are rigidly secured to the supporting element 94 by means of a bracket 143.

In the position of the cams 86 and 87 shown in full lines of Figs. 12 to 14, the valve 90 is closed. In such position the diaphragm is in communication with the sub-atmospheric pressure source through the flexible conduit 137 for the purpose of drawing the diaphragm closely against the face of the press jaw 105 to prevent sagging of the diaphragm. Then upon rotation of the cam shaft 85 in the direction of the arrow (Figs. 12 to 14), the roller 130 is actuated into engagement with a neutral cam section 144 approximately at the time of engagement of the roller 88 with the pressure section 108 of the other cam. This action closes the valve 131 and discontinues communication with the source of sub-atmospheric pressure while the pressure is supplied through the conduit 100 to the diaphragm. The valve 131 remains closed until the neutral cam section 107 again engages the roller 88 at which time the vacuum section 140 of the cam 87 engages the roller 130 again to draw the diaphragm against the face of the upper jaw 105.

The relative positions of the cams 86 and 87 on the cam shaft 85 is so selected as to avoid conflict between pressure and vacuum. That is, the pressure source and sub-atmospheric or vacuum source are never concurrently in communication with the diaphragm. The pressure is definitely closed off before the vacuum becomes effective and, conversely, the vacuum source is definitely closed off before the pressure becomes effective.

Thus the valves 90 and 131 under the influence of the rotating cam sections coact in such manner that the vacuum valve 131 is inactive or closed while the pressure valve 91 operates to supply fluid under pressure to the diaphragm then to exhaust the compressed fluid. Conversely as soon as the pressure valve is actuated to neutral position, the vacuum valve is operated in the manner specified. These actions are effected in response to a single revolution of the cam shaft 85 and, as the cams approach the position indicated in full lines of Figs. 12 to 14, a switch operating member 150 on the cam shaft actuates a switch 151 to de-energize or stop the operation of the motor unit 83. This actuation completes one cycle of operation of the apparatus. Therefore, it will be apparent that as soon as the cutting or scoring operation is completed, the conveyor belts are actuated and the cycle of operation described is commenced. While the conveyors are in stationary position, the glass units are placed thereon preparatory to the cutting operation.

In order to avoid injury to the diaphragm when drawn by sub-atmospheric pressure against the face of the press jaw 105 and to avoid entrapment of fluid at localized areas, the face of the jaw is grooved, as indicated at 155, and the openings in the jaw leading to the conduits 101 and 138 are provided with screens 156 which adequately provide for passage of fluid to maintain the diaphragm pressed thereagainst and substantially free from bulges. The plates 156 are secured flush with the lower surface of the jaw 105 and are provided with openings 157.

In the intermittent operation of the apparatus as described, a glass unit is successively moved from station A, where it is scored, to an open or intermediate station B, where it can be inspected, or a glass unit can be scored and placed at station B in order that the first actuation of the switch 53 may cause the glass unit to be moved directly to the bed plate or jaw 110 at the station C where pressure is applied for snapping the marginal portions as described. In the succeeding cycle of operation, the glass unit is moved to station D where the snapped off marginal portions or salvage is removed. The completely trimmed sheet glass can then be removed or stacked as desired or fed to another conveyor for further handling.

In the form of mounting for the diaphragm 104 shown in Fig. 11, the filler or securing strip 114 is provided with a resilient metal strip 160 disposed between the filler and the marginal portion of the diaphragm and a pivotal filler section 161 is provided with a rounded bead 163 at one edge which fits into a similarly shaped socket 164. The resilient strip maintains the bead in the socket and normally urges the section 161 upwardly. This action is facilitated by a flanged portion 166 of the resilient strip which fits about the free edge of the section 161. Under the influence of fluid pressure upon the diaphragm 104, the pivotable filler section 161 contacts the face of the conveyor 56 and prevents any tendency of the diaphragm to blow out. This arrangement is applicable along opposite sides as well as along opposite ends of the press jaw 105. As soon as pressure is relieved, each resilient strip 160 will actuate the section 161 and the adjacent portion of the diaphragm upwardly away from their position of contact with the belt.

In the form of the invention shown in Figs. 5 to 8, there is provided a synchronized multiple cutting apparatus 170 which includes the essential elements corresponding to those described with reference to Figs. 1 to 4, and hence further description of these elements is not necessary for proper understanding of the invention.

However, certain additional structure is present including sprocket and chain gearing 171 which is also connected in driving relation to the motor 54 for driving an upper conveyor belt 173 which is trained about drums 174 and 175, the latter of which is connected in direct driving relation with the gearing. The drums are carried rotatably upon bearing supports 176 forming a part of the apparatus frame.

In the multiple apparatus, the conveyor belts 21 and 56 carry two units in side by side relation and the press jaws 105 and 110 are made sufficiently wide to accommodate these units. Another pair of press jaws 180 and 181 are arranged immediately adjacent the jaws 105 and 110 and are constructed in substantially the same manner with the exception that the diaphragm 183 in the second pair (Fig. 7) is disposed upon the lower jaw instead of the upper jaw. Glass units are transported between the lower reach of the upper belt 173 and the upper reach of the lower belt 56. The two pairs of jaws are so arranged that the glass units are moved from one pair to the other in connection with one cycle of operation of the apparatus.

In this arrangement the pressure conduit 100 communicates with both the presses through the conduits 101. When the conduit 101 that is so connected to the upper press jaw 105 is supplying fluid under pressure to actuate the glass unit against the lower jaw 110, at the same time, the conduit 101 connected to the lower jaw 180 is also supplying fluid under pressure to actuate another glass unit upwardly against the upper jaw 181. This type of operation is designed for running cuts in laminated glass and in preparing glass unit 20 of laminated form, they are scored by means of a cutter which produces scores 185 (Fig. 15) coextensively on opposite sides of the marginal portions of each laminated unit. These units are then placed upon the apparatus at either or both stations B (Fig. 5). In the first cycle of operation, the glass units are moved to station C where the diaphragm is pressed downwardly by the fluid under pressure to perform the snapping action on one side of each laminated unit. In the next succeeding cycle of operation the glass units are moved to station c where they are pressed upwardly to perform the snapping action on the other side of each laminated unit. Thus during the continued operation of the apparatus, each laminated glass unit at station C is subjected to snapping by downward pressure, and simultaneously each similar laminated glass unit at station c is subjected to like action by upward pressure. It is, of course, to be understood that additional glass units are fed to the apparatus at station B after each snapping or fluid pressure operation. An example of a type of cutter employed for scoring opposite sides of laminated glass is described in my U. S. Patent No. 1,999,594 of April 30, 1935. The cutting apparatus shown in the drawings are not designed for scoring upon opposite sides of the laminated glass.

When the apparatus is used to run cuts in laminated glass the switches 50 or 53 can be actuated manually in order to initiate operation of the conveyors instead of actually operating the machines 33. In this way the cycle of operation previously described is initiated.

It is to be understood that this type of multiple apparatus can also be employed for running cuts in glass units scored only on one side. In the latter operation, pressure and vacuum conduits 101 and 138 connected to the lower jaw 180 are closed by suitable valves 189. Then the diaphragm between the jaws 180 and 181 lie flat against the face of the lower jaw without interfering with the passage of the conveyor belts 56 and 173 in transporting the glass units through the apparatus.

In operating the cutting apparatus 33, one operator is normally assigned to each machine and they gauge their actions as nearly as possible to complete the cuts concurrently. However, it will be noted that there is a switch 50 operable by each cutting machine for electrically starting the motor 54. Conventional electrical connections are employed by which either switch may initiate the operation only after the other has been operated. In this manner the operator whose cutting operation is slightly delayed always completes the electric circuit for energizing the motor 54. If it is desirable to operate only one cutter 33, a two-way switch 190 can be actuated to provide for operation of either one or the other of the machines. Thus one cutter can be inactive while the other operates.

Although more than one form of the invention has been shown and described in detail it will be apparent to those skilled in the art that the invention is not limited to these forms, but that various changes can be made therein without departing from the spirit of the invention or from the scope of the appended claims.

I claim:

1. An apparatus for running marginal cuts along sheet glass comprising spaced stationary jaws, one jaw having a yieldable layer of material on the face thereof for receiving a marginally scored sheet glass unit, the other jaw having a diaphragm thereon operable to cover the glass unit, and fluid pressure means communicating with the diaphragm to press the latter uniformly over the area of the glass unit against the yieldable material and thereby to snap the glass unit along its scored portion.

2. An apparatus for running marginal cuts along sheet glass comprising spaced stationary jaws, one of said jaws having a diaphragm thereon flexible toward and against the other jaw, a driven conveyor movable between the jaws to transport a marginally scored glass unit into registering relation with the diaphragm, and fluid pressure means communicating with the diaphragm and operable to press the glass against the conveyor and thereby snap the glass along its scored area.

3. An apparatus comprising a pair of stationary jaws, means for securing the jaws in opposed spaced relation, a diaphragm mounted upon the face of one jaw and expandible against the opposed jaw for covering a flat glass unit scored along its edges, the opposed jaw constituting a flat platen and including a surface layer of pressure-resisting material sufficiently yieldable to insure the snapping of the glass along its scored area in response to the pressing of the glass unit by the diaphragm against the opposed jaw, and fluid pressure means communicating with the diaphragm for uniformly pressing the latter over the area of the flat glass and against the opposed jaw in sufficient intensity to snap the glass along its scored area.

4. In an apparatus for running marginal cuts along sheet glass, a pair of spaced opposed jaws defining a passage therebetween, diaphragms secured on the respective jaws in offset relation and expandible in opposite directions across the passage for surface engagement over the area of the marginally scored glass, and fluid pressure means communicating with each diaphragm to press the latter against its opposed jaw and snap the glass along the marginally scored area thereof.

5. In an apparatus for running cuts along flat laminated glass scored coextensively on its opposite marginal sides, a pair of spaced opposed jaws for receiving the scored glass therebetween, each of said jaws having a flat surface facing the space between the jaws, a diaphragm on one jaw facing the flat surface of the other jaw for surface engagement with one side of the marginally scored glass, fluid pressure means communicating with said diaphragm to press the latter toward the opposed jaw and snap the glass along its marginally scored area on one side thereof, and a second diaphragm communicating with said fluid pressure means and mounted on said other jaw in facing relation to the flat surface of its opposed jaw for engagement with the other side of the scored glass to snap the glass in response to fluid pressure applied thereto.

6. In an apparatus for running marginal cuts along sheet glass units, opposed jaws for receiving a plurality of sheet glass units therebetween, diaphragms mounted upon the jaws in offset relation whereby one diaphragm is expandible toward and against one jaw and the adjacent diaphragm is expandible toward and against the other jaw, and means for supplying fluid under pressure to the inner side of each diaphragm to press the latter together with the glass unit toward and against the opposed jaw.

7. In an apparatus for running marginal cuts along sheet glass units, opposed jaws for receiving a plurality of sheet glass units therebetween, simultaneously expandible diaphragms mounted upon the opposite jaws in offset relation whereby one diaphragm is expandible toward one jaw and the adjacent diaphragm is simultaneously expandible toward the other jaw, and means supplying fluid under pressure concurrently to the inner sides of the diaphragms to press each of the latter together with a sheet glass unit toward its opposed jaw.

8. In an apparatus for running marginal cuts along sheet glass units, opposed jaws for receiving a plurality of sheet glass units therebetween, diaphragms mounted upon the jaws in offset relation whereby one diaphragm is expandible toward one jaw and the adjacent diaphragm is expandible toward the other jaw, means for conveying the sheet glass units between the jaws into proximity to the diaphragms, and means supplying fluid under pressure to the inner side of each diaphragm to press the latter together with a sheet glass unit toward the opposed jaw.

9. An apparatus for running marginal cuts along a sheet glass unit comprising a stationary flat platen including a cushioning member thereon for supporting the glass unit, a stationary press head having a fluid pressure space therein, a diaphragm covering the fluid-pressure space in said head and removable into contact with said platen in response to fluid under pressure to press the glass against the cushioning member, and means for supplying fluid under pressure to the fluid pressure space.

10. An apparatus for running marginal cuts along a sheet glass unit comprising a stationary supporting surface having a yieldable material thereon for supporting the glass, a stationary press head having a resilient diaphragm mounted in fluid tight relation thereon opposite the supporting surface, means for pneumatically pressing the diaphragm uniformly upon the surface of the glass.

11. In an apparatus for running marginal cuts along a sheet glass unit, a supporting surface, a stationary press head having a flexible diaphragm mounted in fluid tight relation along the face thereof opposite the supporting surface, means for supplying fluid under pressure to the diaphragm to press it against the glass unit, a conveyor movable periodically for transporting the glass unit to a position between said head and surface to be pressed by the diaphragm, and said surface resisting pressure of the diaphragm against the glass-carrying conveyor and mechanism operatively associated with the conveyor and said means to synchronize operations of successively moving the conveyor to said position and supplying fluid under pressure to the diaphragm.

WILLIAM OWEN.